(12) United States Patent
Beswick et al.

(10) Patent No.: US 9,102,551 B2
(45) Date of Patent: Aug. 11, 2015

(54) MEDIA FOR THE REMOVAL OF HEAVY METALS AND VOLATILE BYPRODUCTS FROM DRINKING WATER

(75) Inventors: Colin Beswick, Middlesex, NJ (US); Thomas Shaniuk, Strongville, OH (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/594,072

(22) Filed: Aug. 24, 2012

(65) Prior Publication Data

US 2012/0318742 A1 Dec. 20, 2012

Related U.S. Application Data

(63) Continuation of application No. 11/467,649, filed on Aug. 28, 2006, now abandoned.

(51) Int. Cl.
*C02F 1/28* (2006.01)
*C02F 101/20* (2006.01)
*C02F 101/32* (2006.01)

(52) U.S. Cl.
CPC .............. *C02F 1/288* (2013.01); *C02F 1/281* (2013.01); *C02F 1/283* (2013.01); *C02F 2101/20* (2013.01); *C02F 2101/322* (2013.01); *C02F 2303/26* (2013.01)

(58) Field of Classification Search
CPC .......... C02F 1/288; C02F 1/281; C02F 1/283; C02F 2303/26; C02F 2101/20; C02F 2101/322
USPC ................ 210/502.1; 502/413, 416, 417
See application file for complete search history.

(56) References Cited

U.S. PATENT DOCUMENTS

| | | | |
|---|---|---|---|
| 3,250,397 A | 5/1966 | Moltchan | |
| 4,515,756 A | 5/1985 | Blumer | |
| 5,053,139 A | 10/1991 | Dodwell et al. | |
| 5,071,587 A | 12/1991 | Perman | |
| 5,254,516 A | 10/1993 | Gupta et al. | |
| 5,277,931 A * | 1/1994 | Maglio et al. | 427/212 |
| 5,296,438 A | 3/1994 | Heung | |
| 5,505,841 A | 4/1996 | Pirbazari et al. | |
| 5,569,445 A | 10/1996 | Fukatsu et al. | |
| 5,603,838 A | 2/1997 | Misra et al. | |
| 6,030,537 A | 2/2000 | Shaniuk et al. | |
| 6,342,191 B1 | 1/2002 | Kepner et al. | |
| 6,498,259 B1 | 12/2002 | Grey et al. | |
| 6,849,187 B2 | 2/2005 | Sahniuk | |
| 2002/0074292 A1 | 6/2002 | Schlegel et al. | |
| 2006/0163151 A1 | 7/2006 | Kawasaki et al. | |
| 2007/0221569 A1 * | 9/2007 | Stouffer et al. | 210/502.1 |

FOREIGN PATENT DOCUMENTS

| | | |
|---|---|---|
| DE | 4320003 | 12/1994 |
| WO | 8303595 | 10/1983 |
| WO | 9637438 | 11/1996 |
| WO | 9950182 | 10/1999 |
| WO | 0154786 | 8/2001 |
| WO | 0226630 | 4/2002 |
| WO | 0226631 | 4/2002 |
| WO | 0226632 | 4/2002 |
| WO | 0226633 | 4/2002 |
| WO | 0247811 | 6/2002 |

OTHER PUBLICATIONS

Proceedings of the 50th Industrial Waste Conference, May 8-10, 1995, Purdue Research Foundation, p. 230.*
Ken Schaeffer et al, Coconut Shell Versus Bituminous Coal Activated Carbon, Jun. 2008, Water conditioning & Purification, three pages.*
Robert J. Potwora, Trihalomethane Removal with Activated Carbon, Jun. 2006, Water Conditioning & Purification, three pages.*
Gupta, et al.; "Arsenic Removal by Adsorption"; Mar. 1978; pp. 493-506.
Anderson, et al.; "Arsenate Adsorption on Amorphous Aluminum Hydroxide"; Journal of Colloid and Interface Science, vol. 54, No. 3, Mar. 1976; pp. 391-399.
Gulledge, et al.; "Removal of Arsenic (V) From Water by Adsorption on Aluminum and Ferric Hydroxides"; Journal Water Technology/Quality J-AWWA; Aug. 1973; pp. 548-552.
Raven Klaus P. et al, Arsenite and Arsenate Adsorption on Ferrihydrite: Kinetics, Equilibrium, and Adsorption Envelopes, Environmental Science and Technology, vol. 32, No. 3, Feb. 1, 1998, pp. 344-349, XP002276906, ISSN: 0013-936X, p. 344-p. 345, Left-Hand Column.
International Search Report for PCT/US03/39005 dated Apr. 23, 2004.
International Search Report for PCT/US 07/76975 dated Jan. 24, 2008.
United States Office Action for U.S. Appl. No. 11/467,649 dated Oct. 21, 2009.
United States Office Action for U.S. Appl. No. 11/467,649 dated Apr. 7, 2010.
United States Office Action for U.S. Appl. No. 11/467,649 dated Aug. 31, 2010.
United States Office Action for U.S. Appl. No. 11/467,649 dated Aug. 17, 2011.
United States Office Action for U.S. Appl. No. 11/467,649 dated Dec. 12, 2011.
United States Office Action for U.S. Appl. No. 11/467,649 dated Feb. 14, 2012.
United States Office Action for U.S. Appl. No. 11/467,649 dated Apr. 20, 2012.

* cited by examiner

*Primary Examiner* — Matthew O Savage
(74) *Attorney, Agent, or Firm* — Drinker Biddle & Reath LLP

(57) ABSTRACT

Water purification media contain an activated carbon having at least one of specific a particle size, surface area, and porosity; and a microcrystalline and/or amorphous titanosilicate at least partially coating the activated carbon. Methods of making the media of microcrystalline and/or amorphous titanosilicate coated activated carbon involve contacting activated carbon with titanosilicate precursors. Methods of purifying water involve contacting water containing both heavy metals and volatile byproducts with the media.

21 Claims, No Drawings

MEDIA FOR THE REMOVAL OF HEAVY METALS AND VOLATILE BYPRODUCTS FROM DRINKING WATER

CROSS-REFERENCE TO RELATED APPLICATIONS

This application is a Continuation of application Ser. No. 11/467,649 filed Aug. 28, 2006, now abandoned; the entire contents of which are incorporated herein by reference.

TECHNICAL FIELD

The invention generally relates to media that can remove heavy metals and volatile byproducts from aqueous systems, as well as methods of making and using the media including methods of purifying drinking water.

BACKGROUND

Even low levels of heavy metals (for example arsenic, lead, cadmium, mercury, etc.) in drinking water are considered detrimental to a person's health, and in the case of infants, are believed to impede intellectual development. For example, in babies and children, exposure to lead in drinking water above the action level can result in delays in physical and mental development, along with slight deficits in attention span and learning abilities. In adults, lead exposure via drinking water can cause increases in blood pressure, as well as the development of kidney problems.

Recognizing these hazards, the Environmental Protection Agency (EPA) has established limits on the presence of heavy metals in drinking water. For example, no more than 15 parts per billion (15 ppb) of lead may be present in public water systems. In addition, industrial water streams must contain less than 0.5 ppm of heavy metals before the water can be discharged.

In addition to reducing the heavy metals to acceptable EPA levels, it is desirable to improve the taste, odor and smell of drinking water by removing chlorine, ionic metals, organic molecules and colloidal particles. Ion exchangers, both organic and inorganic, including crystalline molecular sieve zeolites, are known to remove certain metals from aqueous systems such as drinking water. Activated carbon is also used in water purification or remediation processes. Activated carbon improves taste, odor and smell by adsorbing ionic metals, organic molecules and colloidal particles and also removes chlorine.

In addition to esthetic effects, elevated levels of certain contaminants, for example halogenated organic compounds, are known to be able to detrimentally impact health in ways such as increasing the risk of certain cancers.

The purification of drinking water is often accomplished at its point of use, such as under-the-counter, on-the-counter, whole house systems, end-of-tap, or free standing gravity flow carafe type devices. For industrial/commercial applications, packed bed systems are typically used.

There is an ongoing effort to develop improved products which meet or exceed EPA and other regulatory body requirements for heavy metals and halogenated byproducts removal as well as improved taste, color and odor, and have flow rates which are commercially acceptable. In circumstances where the filter size is limited and/or high flow rates are required, there is particular need for effective drinking water purification techniques.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides a media that can advantageously remove both heavy metals and volatile byproducts from water. The media can be employed effectively in end of tap applications and granular bed applications, where high water flow rates are encountered, coupled with limited filter size restraints.

One aspect of the invention relates to water purification media or compositions containing an activated carbon having at least one of a specific particle size, surface area, and porosity with a microcrystalline and/or amorphous titanosilicate at least partially coating the activated carbon.

Another aspect of the invention relates to methods of making a water purification composition by contacting activated carbon, a titanium compound, a silicon compound, and optionally a hydroxide compound to form a mixture, typically an aqueous mixture, and drying the mixture to provide a microcrystalline and/or amorphous titanosilicate coated activated carbon capable of purifying water.

Yet another aspect of the invention relates to methods of purifying water or removing heavy metals and volatile byproducts from water involving contacting water comprising a first amount of a heavy metal and a first amount of a volatile byproduct with the water purification media and recovering water comprising a second amount of the heavy metal and a second amount of the volatile byproduct, wherein the second amount of the heavy metal is less than the first amount of the heavy metal and the second amount of the volatile byproduct is less than the first amount of the volatile byproduct.

To the accomplishment of the foregoing and related ends, the invention comprises the features hereinafter fully described and particularly pointed out in the claims. The following description sets forth in detail certain illustrative aspects and implementations of the invention. These are indicative, however, of but a few of the various ways in which the principles of the invention may be employed. Other objects, advantages and novel features of the invention will become apparent from the following detailed description of the invention.

DETAILED DESCRIPTION

The media is suitable for use in the removal of both heavy metals and volatile byproducts from aqueous systems that contain at least one heavy metal and at least one volatile byproduct. The media is particularly effective at removing lead and volatile chlorination byproducts from drinking water.

For purposes of this invention, the term heavy metals includes heavy metal ions (for example Pb (II), Pb (IV), Hg (II), Cr (III), Co (II), Co (III), Cd (II), Ag (I) As (III), As (V), and the like), heavy metals, and compounds containing at least one heavy metal atom (for example, sodium arsenate). Examples of heavy metals include one or more of lead, cadmium, zinc, copper, chromium, cobalt, arsenic, and mercury. For purposes of this invention, the term volatile byproducts include carbon containing compounds and particularly halocarbons. Examples of volatile byproducts include volatile chlorination byproducts such as trihalomethanes (for example; chloroform, bromoform, bromodichloromethane, and chlorodibromomethane), bromate, chlorite, haloacetic acids, chloramines, and the like and volatile organic byproducts such as benzene, halobenzenes, acrylamide, carbontetrachloride, bromodichloromethane, chlorodibromomethane, dichloroethylene, dichloromethane, halopropanes, dioxin, alkylbenzenes, PCBs, toluene, xylenes, vinyl chloride, styrene, and the like.

The aqueous systems to which the methods are typically applied are industrial, municipal, remote, or residential water streams. For example, the media can be employed in the treatment of drinking water, in an industrial, municipal, residential, or remote (portable) context to decrease the amount of heavy metals and volatile byproducts in the water. In residential water streams, the media can be particularly useful in end of tap (EOT) or inline applications where limited filter or cartridge size and high flow rates may otherwise raise concerns.

The media contains activated carbon having a specific particle size, pore structure, and/or surface area, which contribute to its ability to remove unwanted heavy metals and volatile byproducts from aqueous systems. The activated carbon may also have levels of microporosity, mesoporosity, and/or macroporosity, which further contribute to its ability to remove unwanted heavy metals and volatile byproducts from aqueous systems. The activated carbon has titanosilicate precursors secured on its surface.

The media is formed in a manner that maximizes the ability to remove unwanted heavy metals and volatile byproducts from aqueous systems. The media has a high capacity for both heavy metals and volatile byproducts compared to conventional water purification materials, which often can remove either heavy metals or volatile byproducts, but not both effectively.

The media is made by combining activated carbon with titanosilicate precursors in a suitable manner to secure the titanosilicate precursors on the surface of the activated carbon. While not wishing to be bound by any theory, it is believed that the titanosilicate precursors form a microcrystalline and/or amorphous titanosilicate on the surface of the activated carbon, as opposed to a purely crystalline form of titanosilicate. The activated carbon having specific particle size, pore structure, and/or surface area with a microcrystalline and/or amorphous titanosilicate on its surface is effective in removing both heavy metals and volatile byproducts from aqueous streams. It has been determined that certain activated carbon can remove volatile chlorination byproducts from water and that crystalline titanosilicate can remove lead from water. It has also been found in some cases that the traditional combination of crystalline and/or amorphous titanosilicate on activated carbon is not effective in removing both heavy metals and volatile byproducts from aqueous streams to levels below regulatory limits in cases where filter or cartridge size is limited and flow rates are relatively high.

In one embodiment, thus, the media of microcrystalline and/or amorphous titanosilicate on the surface of the activated carbon does not comprise more than about 5% by weight of crystalline titanosilicate. In another embodiment, the media of microcrystalline and/or amorphous titanosilicate on the surface of the activated carbon does not comprise more than about 2% by weight crystalline titanosilicate. In yet another embodiment, the media of microcrystalline and/or amorphous titanosilicate on the surface of the activated carbon does not comprise any detectable crystalline titanosilicate.

The activated carbon has at least one of a specific particle size, pore structure, and surface area. In another embodiment, the activated carbon has at least two of a specific particle size, pore structure, and surface area. In yet another embodiment, the activated carbon has at least three of a specific particle size, pore structure, and surface area.

The activated carbon may have a particle size distribution which contributes to the ability of the media to remove both heavy metals and volatile byproducts from aqueous systems. In one embodiment, the activated carbon has a particle size range distributed mostly (more than 50% by weight) from about 50 to about 500 µm. In another embodiment, the activated carbon has a particle size range distributed mostly from about 60 to about 300 µm. In yet another embodiment, the activated carbon has a particle size range distributed mostly from about 70 to about 250 µm. In the case where the activated carbon is in the form of fibers and not particles, the particle size range distributions listed above refer to average cross-sectional diameter of the carbon fibers.

The activated carbon may have a surface area which contributes to the ability of the media to remove both heavy metals and volatile byproducts from aqueous systems. In one embodiment, the surface area of the activated carbon is about 300 $m^2/g$ or more and about 1,600 $m^2/g$ or less. In another embodiment, the surface area of the activated carbon is about 500 $m^2/g$ or more and about 1,400 $m^2/g$ or less. In yet another embodiment, the surface area of the activated carbon is about 700 $m^2/g$ or more and about 1,200 $m^2/g$ or less.

The activated carbon may have a unique distribution of pore sizes that contributes to the ability of the media to remove both heavy metals and volatile byproducts from aqueous systems. In one embodiment, the activated carbon has a porosity of at least about 0.25 cc/g in pores diameter of at least about 10 and at most about 500 Å (Hg intrusion porosimetry, such as using a Micromeritics model AutoPore-II 9220 porosimeter in accordance with the analysis method outlined in one or more of U.S. Pat. Nos. 5,186,746; 5,316,576; and 5,591,256). In another embodiment, the activated carbon has a porosity of at least about 0.4 cc/g in pores diameter of at least about 10 and at most about 500 Å. In yet another embodiment, the activated carbon has a porosity of at least about 0.4 cc/g in pores diameter of at least about 10 and at most about 500 Å.

The activated carbon may have levels of microporosity, mesoporosity, and/or macroporosity which contribute to the ability of the media to remove both heavy metals and volatile byproducts from aqueous systems. In particular, the activated carbon has a relatively high percentage (a major amount) of its pores as mesoporous and relatively low percentages (minor amounts) of its pores as microporous.

Microporosity refers to pores having a size (average cross-section) of less than 2 nm, mesoporosity refers to pores having a size from 2 nm to 50 nm, while macroporosity refers to pores having a size greater than 50 nm. A major amount refers to 50% or more while a minor amount refers to less than 50%.

In one embodiment, the levels of porosity in the activated carbon are less than 50% microporosity, from 50% to about 100% mesoporosity and/or macroporosity. In another embodiment, the levels of porosity in the activated carbon are less than about 40% microporosity, from about 60% to about 99% mesoporosity and/or macroporosity. In yet another embodiment, the levels of porosity in the activated carbon are less than about 35% microporosity, from about 65% to about 95% mesoporosity and/or macroporosity. The relatively high levels of mesoporosity and/or macroporosity improve the adsorptive characteristics of the media.

In one embodiment, in the mesoporosity and/or macroporosity fraction, the levels of porosity are from about 0% to about 100% mesoporosity and from about 0% to about 100% macroporosity. In another embodiment, in the mesoporosity and/or macroporosity fraction, the level of mesoporosity is greater than the level of macroporosity. In yet another embodiment, in the mesoporosity and/or macroporosity fraction, the levels of porosity are from about 60% to about 99% mesoporosity and from about 1% to about 40% macroporosity.

The activated carbon may be chemically activated or non-chemically activated. Chemical activating agents include one or more of alkali metal hydroxides, alkali metal carbonates, alkali metal sulfide, alkali metal sulfates, alkaline earth metal carbonates, alkaline earth metal chlorides, alkaline earth metal sulfates, alkaline earth metal phosphates, phosphoric acid, polyphosphoric acid, pyrophosphoric acid, zinc, chloride, sulfuric acid, and the like. Chemical activation is conducted by contacting one or more carbonaceous materials with one or more chemical activating agents, mixing, optionally heating, optionally washing/rinsing, and optionally drying the chemically activated material. Non-chemical activation is conducted by heating.

The titanosilicate precursors include a titanium compound and a silicon compound. A hydroxide compound may be combined with either the titanium compound and/or the silicon compound to facilitate application to the activated carbon. The titanium compound and/or silicon compound form a microcrystalline and/or an amorphous titanosilicate on the surface of the activated carbon.

The titanium compound has the ability to react with the silicon compound under suitable conditions to form a microcrystalline and/or amorphous titanosilicate on the surface of the activated carbon. The titanium compound may or may not be water soluble. General examples of the titanium compound include titanates such as metal titanates, organic titanates, and halotitanates; titanium oxides such as titanium dioxide; and the like. Specific examples of the titanium compound include sodium titanate, calcium titanate, potassium titanate, magnesium titanate, dichloro-oxy-titanate, difluoro-oxy-titanate, dibromo-oxy-titanate, titanium ethoxide, titanium butoxide, titanium propoxide, titanium isopropoxide, titanium ethylhexoxide, and the like.

The silicon compound has the ability to react with the titanium compound under suitable conditions to form a microcrystalline and/or amorphous titanosilicate on the surface of the activated carbon. The silicon compound may or may not be water soluble. General examples of the silicon compound include metal silicates and organic silicates. Specific examples of the silicon compound include sodium silicate, potassium silicate, calcium silicate, magnesium silicate, phosphosilicate, tetraethylorthosilicate, and the like.

General examples of hydroxide compounds include ammonium hydroxides, alkali metal hydroxides, and alkaline earth metal hydroxides. Specific examples of hydroxide compounds include ammonia hydroxide, alkyl ammonium hydroxide, tetra-alkylammonium hydroxides, sodium hydroxide, potassium hydroxide, calcium hydroxide, magnesium hydroxide, mixtures of two or more thereof, and the like. In embodiments where a hydroxide compound is employed, it is typically combined with one or both of the titanium compound and the silicon compound in an aqueous solution before contact with the activated carbon.

The activated carbon and the titanosilicate precursors may be in aqueous solutions when combined. Alternatively, one of the activated carbon and one or more the titanosilicate precursors may be in an aqueous solution and the other(s) in dry form when combined.

In embodiments where aqueous solutions of the one or more the titanosilicate precursors are combined, the concentrations of the titanium compound and the silicon compound are sufficient to facilitate formation of a microcrystalline and/or amorphous titanosilicate on the surface of the activated carbon. In one embodiment, one or more aqueous solutions contain from about 1% to about 50% by weight of at least one titanium compound and from about 0% to about 50% by weight, and more typically from about 1% to about 50% by weight of at least one silicon compound and optionally from about 1% to about 50% by weight of at least one hydroxide compound. In another embodiment, one or more aqueous solutions contain from about 5% to about 40% by weight of at least one titanium compound and from about 5% to about 40% by weight of at least one silicon compound and optionally from about 5% to about 30% by weight of at least one hydroxide compound. In yet another embodiment, one or more aqueous solutions contain from about 10% to about 35% by weight of at least one titanium compound and from about 10% to about 35% by weight of at least one silicon compound and optionally from about 10% to about 25% by weight of at least one hydroxide compound.

In some instances, the microcrystalline and/or amorphous titanosilicate formed on the surface of the activated carbon is made with at least one titanium compound and at least one hydroxide compound, but not a silicon compound. As used herein, the term titanosilicate is intended to cover this possibility.

Once combined, the combination solution containing the activated carbon, titanium compound, silicon compound, and optionally the hydroxide compound is mixed to facilitate formation of a microcrystalline and/or amorphous titanosilicate on the surface of the activated carbon. In order to facilitate formation of the microcrystalline and/or amorphous titanosilicate on the surface of the activated carbon, the pH is maintained in the neutral to moderately basic range. In one embodiment, the combination solution is maintained at a pH from about 6 to about 12 to facilitate formation of the microcrystalline and/or amorphous titanosilicate on the surface of the activated carbon. In another embodiment, the combination solution is maintained at a pH from about 7 to about 10.

In one embodiment, the amount of water employed is an amount up to the point of incipient wetness. Reference is made to the method described in U.S. Pat. No. 4,134,860, which is hereby incorporated by reference. The point of incipient wetness is the point at which the amount of liquid such as water added is the lowest concentration at which the dry or powdered mixture is sufficiently dry so as to absorb essentially all of the liquid. In this way, soluble titanosilicate precursors in water can be added into the activated carbon.

After the microcrystalline and/or amorphous titanosilicate coating is formed on the surface of the activated carbon, the combination solution or slurry is filtered and washed in any suitable manner to recover the media. For example, the microcrystalline and/or amorphous titanosilicate coated activated carbon slurry may be filtered in a filter press, centrifuge, drum filter, or any other filtration process. The recovered media may be optionally washed with water to remove any undesirable residual compounds or salts (such as NaCl, KCl, $NH_4Cl$, and the like).

The media is then dried. The media can be allowed to dry without introducing heat. Alternately, the media can be milled and/or screened in a wet state or dry state to produce a smaller size material or obtain a subset particle size distribution.

Drying may involve at least one of heating, storing under vacuum, spray drying, spin flash drying, and desiccation. Heating involves exposing the media to elevated temperatures for a suitable period of time to induce the release of water. In one embodiment, the media is exposed to temperatures from about 30° C. to about 150° C. for a time from about 1 minute to about 50 hours. In another embodiment, the media is exposed to temperatures from about 50° C. to about 100° C. for a time from about 10 minutes to about 20 hours. In yet another embodiment, the media is exposed to temperatures from about 70° C. to about 90° C. for a time from about 1 hour to about 15 hours. Advantageously, heating does not significantly decrease the removal capacity of the media.

The media can consist essentially of the titanosilicate coated activated carbon. However, the media containing the titanosilicate coated activated carbon may optionally further contain other adsorptive material, such as one or more of untreated activated carbon, activated carbon treated or coated in some other process, ionic resin, granular titanosilicate, ferric hydroxide, alumina, magnesia, bauxite, zeolites, and the like. In one embodiment, the media contains from about 1% to 100% by weight of the titanosilicate coated activated carbon and from 0% to about 95% of at least one of additional untreated activated carbon, activated carbon treated or coated in some other process, ionic resin, granular titanosilicate, ferric hydroxide, alumina, magnesia, bauxite, and zeolites. In another embodiment, the media contains from about 25% to about 95% by weight of the titanosilicate coated activated carbon and from about 5% to about 75% of at least one of untreated activated carbon, activated carbon treated or coated in some other process, ionic resin, granular titanosilicate, ferric hydroxide, alumina, magnesia, bauxite, and zeolites.

The media contains a sufficient amount of microcrystalline and/or amorphous titanosilicate coated on the activated carbon to facilitate removal of both heavy metals and volatile byproducts from aqueous systems. In this connection, the microcrystalline and/or amorphous titanosilicate at least partially coats the activated carbon, although it may completely coat the activated carbon. In one embodiment, the media contains from about 0.01 g/in$^3$ to about 1 g/in$^3$ of microcrystalline and/or amorphous titanosilicate on the activated carbon. In another embodiment, the media contains from about 0.025 g/in$^3$ to about 0.5 g/in$^3$ of microcrystalline and/or amorphous titanosilicate on the activated carbon. In yet another embodiment, the media contains from about 0.05 g/in$^3$ to about 0.25 g/in$^3$ of microcrystalline and/or amorphous titanosilicate on the activated carbon.

In one embodiment, the media contains from about 0.1% to about 15% by weight of microcrystalline and/or amorphous titanosilicate and from about 85% to about 99.9% by weight activated carbon. In another embodiment, the media contains from about 1% to about 10% by weight of microcrystalline and/or amorphous titanosilicate and from about 90% to about 99% by weight activated carbon. In yet another embodiment, the media contains from about 4% to about 8% by weight of microcrystalline and/or amorphous titanosilicate and from about 92% to about 98% by weight activated carbon.

The media when in granule form contains titanosilicate coated activated carbon having a certain particle size that contributes to its ability to remove unwanted heavy metals and volatile byproducts from aqueous systems. In one embodiment, when the media is employed in granule form, the average particle size distribution is from about 50 µm to about 500 µm. In another embodiment, when the media is employed in granule form, the average particle size by weight is from about 60 µm to about 300 µm. In yet another embodiment, when the media is employed in granule form, the average particle size by weight is from about 70 µm to about 250 µm.

When in granule form, the media contains low levels of fines. Fines are particles smaller than about the lower size limit in the embodiment particle size distribution. The low level of fines contributes to low pressure drop characteristics of the media when used in applications such as in a filter for EOT filtration. In one embodiment, when the media is employed in granule form, the media contains less than about 5% by weight fines. In another embodiment, when the media is employed in granule form, the media contains less than about 2% by weight fines. In yet another embodiment, when the media is employed in granule form, the media contains less than about 1% by weight fines.

The heavy metal and volatile byproduct removal media may be packed into a fixed-bed adsorbent column or container. An aqueous stream containing heavy metals and volatile byproducts is charged or pumped into/through the media in either up-flow or down-flow fashion. Purified water with significantly reduced levels of heavy metals and volatile byproducts flows out of the media. The media provides for a high level of heavy metal and volatile byproduct removal capacity along with easier and smoother operation of EOT applications and/or water treatment systems.

The media may be formed into a multi-component block cartridge filter or formed into a singular-active component block cartridge filter. The media can also be used as is in water treatment or clarification systems and in pre-coat filter/adsorption systems.

In some instances, heavy metal and volatile byproduct removal from aqueous streams can be complicated by the presence of other contaminants such as competing ions and compounds. Such entities include alkaline earth metal ions, often present as calcium or magnesium sulfates, phosphates and silicates, and halide ions such as chlorides or fluorides. The presence of these competing ions in aqueous systems can vary greatly. In one embodiment, an aqueous system that is contacted with the media contains from about 10 ppm to about 1,000 ppm of competing ions and compounds. In another embodiment, an aqueous system that is contacted with the media contains from about 25 ppm to about 800 ppm of competing ions and compounds. In yet another embodiment, an aqueous system that is contacted with the media contains from about 50 ppm to about 300 ppm of competing ions and compounds. In yet another embodiment, an aqueous system that is contacted with the media contains from about 75 ppm to about 200 ppm of competing ions and compounds.

The presence of these competing ions and compounds can particularly make heavy metal removal and VOC removal from aqueous systems much more difficult. This is because the competing ions and compounds present compete for available adsorption sites on the media and consequently lower the heavy metal or VOC removal efficiency of the media. In drinking water treatment, common competing cations are calcium, magnesium, iron from rusty pipes, and copper from plumbing, the most common competing anions are sulfate, phosphate, chloride, carbonate, and fluoride ions, the most common competing compounds are dissolved organic content and silica.

In one embodiment, a EOT filter loaded with the media removes at least about 75% of the heavy metals and at least about 75% of the volatile byproducts in 800 gallons of an aqueous system passed therethrough. In another embodiment, a EOT filter loaded with the media removes at least about 90% of the heavy metals and at least about 90% of the volatile byproducts in 800 gallons of an aqueous system passed therethrough.

In order to meet the EPA standards (United States Environmental Protection Agency), lead concentrations in the effluent or drinking water should be less than 15 ppb and arsenic concentrations in the effluent or drinking water should be less than 10 ppb. As may be seen from the data set forth, the media described herein has the capability of reducing lead and/or arsenic concentrations in aqueous systems well below the EPA levels, while maintaining commercially attractive adsorption capacities and performance.

In one embodiment, aqueous systems passed through the media have at least two of a lead content of about 15 ppb or less, an arsenic content of about 10 ppb or less, and a trihalomethane content of about 100 ppb or less for about 800 gallons or more at a pH of 8.5 in accordance with the NSF International Standard 53. In another embodiment, aqueous systems passed through the media have at least one of a lead content of about 10 ppb or less and a trihalomethane content of about 70 ppb or less for about 800 gallons or more at a pH of 8.5 in accordance with the NSF International Standard 53. In yet another embodiment, aqueous systems passed through the media have at least one of a lead content of about 5 ppb or less and a trihalomethane content of about 60 ppb or less for about 800 gallons or more at a pH of 8.5 in accordance with the NSF International Standard 53.

The media can be packed into a filter or container such as an inline filter, a EOT filter, or a fixed-bed column. The heavy metal and volatile byproduct containing aqueous stream moves through or passes through the media. Treated water with significantly reduced levels of heavy metals and volatile byproducts flows out of the column or container. For example arsenic and/or lead concentrations in the effluent are typically less than about 15 ppb (micrograms/liter), and often the effluent concentrations can be less than about 2 ppb of each heavy metal. The capacity of the media is higher with higher levels of heavy metal permitted in the effluent stream. In residential or remote applications, the media can be used as an EOT filter or a free-flowing granular media, filled into a cartridge with holes on the top to permit entry of the contaminant solution, which is allowed to trickle via gravity flow through the bed of the composite material and then exit through holes on the bottom of the cartridge, possibly into a reservoir to hold the treated water.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Example 1

An aqueous solution of sodium silicate solution (N-Brand®, 8.93% $Na_2O$, 29.2% $SiO_2$) (36 g), 50% sodium hydroxide solution (44 g), and deionized (DI) water (20 g) was added dropwise to activated carbon (250 g). When the addition was completed, an aqueous solution of titanium oxychloride solution (21.9% $TiO_2$, 34.8% Cl) (44.9 g) and DI water (20 g) was added dropwise to the same activated carbon. Thus, the $TiO_2$ and the $SiO_2$ were added to the activated carbon in a Ti:Si molar ratio of about 1:1.4. The resultant material was the washed approximately 15 times by decantation with DI water and then dried at 105° C. overnight.

A sample (63.7 g) of the dried material was loaded into an End of Tap filter. The filter was fixed to an apparatus and exposed to an aqueous influent stream containing chloroform (45 μg/L), bromodichloromethane (30 μg/L), chlorodibromomethane (20 μg/L), and bromoform (5 μg/L). After passing approximately 800 gallons of the charge at a flow rate of approximately 0.5 GPM (gallons per minute) the Total THM (Total TriHaloMethane) concentration was still reduced below (60 μg/L).

Another sample (64.1 g) of the dried material was loaded into an End of Tap filter. The filter was fixed to an apparatus and exposed to an aqueous influent stream containing lead nitrate (lead concentration=150 μg/L), and additional dissolved compounds. After passing approximately 800 gallons at a flow rate of approximately 0.5 GMP the lead concentration of the effluent was still below the detection limit (<2 μg/L).

With respect to any figure or numerical range for a given characteristic, a figure or a parameter from one range may be combined with another figure or a parameter from a different range for the same characteristic to generate a numerical range.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A water purification media comprising:
   an activated carbon, said activated carbon having, in an uncoated state at least one of a particle site distribution from about 50 μm to about 500 μm, a surface area of about 300 $m^2/g$ or more and about 1,600 $m^2/g$ or less, and a porosity of at least about 0.25 cc/g in pores having a diameter of at least about 10 Å and at most about 500 Å;
   and
   an amorphous titanosilicate, said amorphous titanosilicate being a reaction product of aqueous reactants comprising titanosilicate precursors comprising a titanium compound and a silicon compound added to the activated carbon in a Ti:Si molar ratio of about 1:1.4 in the presence of a sodium hydroxide solution, wherein said aqueous reactants have been added to the surface of the activated carbon to the point of incipient wetness,
   wherein the surface of said activated carbon is at least partially coated by the amorphous titanosilicate, and
   wherein said media has a high volatile byproduct removal capacity, as measured by reduction of a total trihalomethane concentration in 800 gallons of an aqueous system containing 100 ppb total trihalomethane to less than 60 ppb for a media sample size of about 64 grams.

2. The water purification media of claim 1, wherein the activated carbon has, in an uncoated state:
   at least two of a panicle size distribution from about 60 μm to about 300 μm, a surface area of about 500 $m^2/g$ or more and about 1,400 $m^2/g$ or less, and
   a porosity of at least about 0.4 cc/g in pores having a diameter of at least about 10 Å and at most about 500 Å.

3. The water purification media of claim 1 comprising from about 0.1% to about 15% by weight of amorphous titanosilicate coated on the activated carbon.

4. The water purification media of claim 1, wherein the activated carbon in an uncoated state has less than 50% microporosity and from 50% to about 100% macroporosity.

5. The water purification media of claim 1, further comprising at least one of ferric hydroxide, alumina, magnesia, bauxite, or zeolites.

6. The water purification media of claim 1 comprising from about 0.01 $g/in^3$ to about 1 $g/in^3$ of amorphous titanosilicate on the activated carbon.

7. The water purification media of claim 1 comprising about 15% by weight of amorphous titanosilicate coated on the activated carbon.

8. An end of tap filter comprising the water purification media of claim 1.

9. A fixed-bed column comprising the water purification media of claim 1.

10. A method, comprising:
   contacting activated carbon and an aqueous titanosilicate precursor to form a mixture,
      wherein the activated carbon has, in an uncoated state, at least one of a particle size distribution from about 50 μm to about 500 μm, a surface area of about 300 m²/g or more and about 1,600 m²/g or less, and a porosity of at least about 0.25 cc/g in pores having a diameter of at least about 10 Å and at most about 500 Å, and
      wherein the titanosilicate precursor aqueous solution comprises aqueous reactant comprising at least one titanium compound, at least one silicon compound, and sodium hydroxide, wherein said aqueous reactants have been added to the surface of the activated carbon to the point of incipient wetness,
      wherein said titanosilicate precursor aqueous solution comprises the titanium compound and the silicon compound in a Ti:Si molar ratio of about 1:1.4, and
      wherein said mixture has a Na:Cl molar ratio of about 1.49:1, and
   drying the mixture to provide a water purification media comprising amorphous titanosilicate coated activated carbon capable of purifying water, with the proviso that such water purification media does not comprise crystalline titanosilicate,
      wherein said media has a high volatile byproduct removal capacity, as measured by reduction of a total trihalomethane concentration in 800 gallons of an aqueous system containing 100 ppb total trihalomethane to less than 60 ppb for a media sample size of about 64 grams.

11. The method of claim 10, wherein the activated carbon, the titanium compound, and the silicon compound are contacted under a pH from about 6 to about 12.

12. The method of claim 10, wherein the composition is dried at a temperature from about 30° C. to about 150° C. for a time from about 1 minute to about 50 hours.

13. The method of claim 10, further comprising contacting the amorphous titanosilicate coated activated carbon media to water comprising a first amount of a heavy metal and a first amount of a volatile byproduct.

14. The method of claim 13, further comprising recovering water comprising a second amount of the heavy metal and a second amount of the volatile byproduct, wherein the second amount of the heavy metal is less than the first amount of the heavy metal and the second amount of the volatile byproduct is less than the first amount of the volatile byproduct.

15. The method of claim 14, wherein the water recovered has a lead content of about 15 ppb Or less and a total trihalomethane content of less than about 60 ppb.

16. The method of claim 14, wherein the heavy metal comprises at least one selected from the group consisting of lead, cadmium, zinc, copper, chromium, arsenic, cobalt, and mercury and the volatile byproduct comprises at least one selected from the group consisting of trihalomethane, bromate, chlorite, haloacetic acids, chloramines, benzene, halobenzenes, acrylamide, carbontetrachloride, bromodichloromethane, chlorodibromomethane, dichloroethylene, dichloromethane, halopropanes, dioxin, alkylbenzenes, PCBs, toluene, xylenes, vinyl chloride, and styrene.

17. The method of claim 10, further comprising enclosing, said water purification media in an end of tap filter.

18. The method of claim 17, wherein the amorphous titanosilicate coated activated carbon media removes at least about 75% of the heavy metal and more than about 40% of the volatile byproduct in 800 gallons of water passed there through.

19. The method of claim 10, wherein the amorphous titanosilicate coated activated carbon media is in granule form, the average granule size by weight is from about 60 μm to about 300 μm.

20. The method of claim 19, wherein the amorphous titanosilicate coated activated carbon media removes more than about 40% or the volatile byproduct in 800 gallons of water passed there through.

21. The method of claim 10, wherein at least one titanium compound is titanium oxychloride and wherein said at least one hydroxide compound is sodium hydroxide, and wherein the molar ratio of Na:Cl in the titanosilicate precursor aqueous solution is about 1.49:1.

* * * * *